US012650202B2

(12) United States Patent
Harder et al.

(10) Patent No.: US 12,650,202 B2
(45) Date of Patent: Jun. 9, 2026

(54) PASSIVE PRESSURE STABILIZATION SYSTEMS FOR AIRCRAFT

(71) Applicant: The Boeing Company, Arlington, VA (US)

(72) Inventors: Todd T. Harder, West Chester, PA (US); Craig W. Eiser, Cochranville, PA (US); John C. Walters, Glen Mills, PA (US)

(73) Assignee: THE BOEING COMPANY, Arlington, VA (US)

( * ) Notice: Subject to any disclaimer, the term of this patent is extended or adjusted under 35 U.S.C. 154(b) by 175 days.

(21) Appl. No.: 18/608,574

(22) Filed: Mar. 18, 2024

(65) Prior Publication Data

US 2025/0290599 A1     Sep. 18, 2025

(51) Int. Cl.
*F16N 17/00*     (2006.01)
(52) U.S. Cl.
CPC .................................. *F16N 17/00* (2013.01)
(58) Field of Classification Search
CPC .... B64D 2033/026; B64D 37/10; F16N 17/00
See application file for complete search history.

(56) References Cited

U.S. PATENT DOCUMENTS

| | | | |
|---|---|---|---|
| 12,410,859 B2 * | 9/2025 | Kapellusch | F16H 57/027 |
| 2022/0316360 A1 * | 10/2022 | Mariotti | F01D 25/20 |
| 2024/0295183 A1 * | 9/2024 | Eberhardt | F16H 57/027 |

FOREIGN PATENT DOCUMENTS

| | | | |
|---|---|---|---|
| CN | 115142955 A | * 10/2022 | F02C 7/06 |

* cited by examiner

*Primary Examiner* — Christopher P Ellis
(74) *Attorney, Agent, or Firm* — Hanley, Flight & Zimmerman, LLC

(57) ABSTRACT

Systems, apparatus, articles of manufacture, and methods are disclosed that include a casing including a first reservoir and a second reservoir, a first passageway to fluidly couple the first reservoir and the second reservoir, a second passageway to fluidly couple the first reservoir and the second reservoir, the second passageway separate from the first passageway, and a breather tube at least partially positioned in the first reservoir, the breather tube to fluidly couple the first reservoir and the second reservoir via the second passageway.

20 Claims, 13 Drawing Sheets

114

Z

Y

X

120

102

106

108

116

118

112

122

104

100

PASSIVE PRESSURE STABILIZATION SYSTEMS FOR AIRCRAFT

GOVERNMENT INTEREST STATEMENT

This invention was made with the United States Government support. The government has certain rights in the invention.

FIELD OF THE DISCLOSURE

This disclosure relates generally to aircraft and, more particularly, to passive pressure stabilization systems for aircraft.

BACKGROUND

Some aircraft (e.g., military aircraft, fighter jets, unmanned vehicles, etc.) are capable of performing various aerial maneuvers during combat. Some such maneuvers includes inverted maneuvers. During inverted maneuvers, different pressurized fluid chambers of aircraft systems may require pressure balancing and/or stabilization.

Figure 1A:
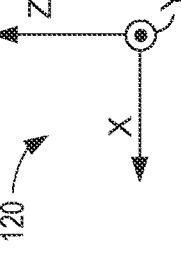
FIG. 1A illustrates an example aircraft implemented with an example passive system in accordance with teachings of this disclosure. The aircraft of FIG. 1A is in an example normal attitude.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Some aircraft (e.g., military aircraft, fighter jets, combat airplanes, etc.) perform aerial maneuvers including, for example, takeoff, landing, ascent (e.g., climbing), descent, turns, barrel rolls, cruising with a normal attitude, maneuvers in an inverted attitude, etc. As used herein, a normal attitude (e.g., a first attitude) is defined as an upright or right-side up position or orientation (e.g., a standard orientation). Normal attitude, first attitude, and upright attitude are interchangeably used herein. As used herein, an inverted attitude (e.g., a second attitude different than the first attitude) is defined as an upside-down position or orientation (e.g., a non-standard orientation). Aircraft (e.g., military aircraft) that are capable of inverted operation use a plurality of techniques to stabilize pressure between different internal components (e.g., engines, gearboxes, fluid reservoirs, etc.). For instance, a pressurized gearbox containing an isolated oil reservoir requires pressure to be equalized between the oil reservoir and a main body or cavity of the gearbox during all operating conditions. For example, some known techniques for stabilizing pressure between reservoirs include employing active systems to control fluid flow between a first location or reservoir and a second location or reservoir.

Some active systems include fluid control valves to stabilize and/or control pressures between a reservoir and main gearbox cavity during various aircraft maneuvers. For example, a ball valve or a one-way valve can be used to stabilize pressure between reservoirs. When a military aircraft is in a normal attitude (e.g., a first orientation, an upright attitude, a standard position, etc.), the fluid control valve can be positioned in a first position to allow fluid flow in a first direction from a first reservoir to a second reservoir. When the military aircraft is in an inverted attitude (e.g., a second orientation, an upside-down attitude, a non-standard position, etc.), the fluid control valve can be positioned in a second position to allow fluid flow in the opposite direction (e.g., unrestricted from flowing in the opposite direction). In some examples, active systems employ a pump to facilitate fluid flow in the first direction and/or the second direction between reservoirs. However, active systems such as valves and pumps require maintenance and/or can be susceptible to mechanical failure issues, resulting in higher maintenance costs.

Example apparatus and/or systems disclosed herein stabilize pressure passively (e.g., without using valves and/or pumps) between reservoirs and/or cavities. Example passive systems disclosed herein include an example network of passageways and an example breather tube. Example passageways and breather tubes disclosed herein maintain (e.g., stabilize, equalize) pressure between an example first location or first reservoir and a second location or second reservoir (e.g., a gearbox main cavity) when the aircraft is in a normal attitude (e.g., first orientation, upright attitude, standard position, etc.), an inverted attitude (e.g., a second attitude opposite the first attitude, a second orientation), or any other attitude (e.g., an attitude between the normal attitude and the inverted attitude). Example passive pressure stabilization systems disclosed herein are valveless and/or pumpless and passively enable pressure stabilization (e.g., equalization) between two or more reservoirs and/or chambers. In some examples, the passageways are integrally formed with a casing or wall of a structure (e.g., a gearbox) and the breather tube communicatively couples one or more passageways and/or the reservoirs. In some examples, the passageways can be provided by tubes, channels, piping, ducts, and/or any other fluid passageways. Examples disclosed herein eliminate use of fluid control valves (e.g., ball valves) and/or utilize core placement to simplify the passive system and enable pressure equalization/stabilization when an aircraft is in any attitude and/or altitude. For example, example systems disclosed herein employ a plurality of passageways (e.g., two passageways) cast within a casing of a gearbox. A first passageway fluidly couples an upper end of a reservoir (e.g., an oil reservoir) to a main body of a gearbox and a second passageway couples a tube adjacent to a lower end of the reservoir with the main body of the gearbox. During inverted operation, air flows through the tube and the second passageway to enable equal pressure between the reservoir and the main body. During normal operation, air flows through the first passageway to enable equal pressure between the reservoir and the main body.

FIG. 1A illustrates an example aircraft 102 implemented with an example passive system 104 in accordance with teachings of this disclosure. The example aircraft 102 of FIG. 1A is in a normal attitude 100 (e.g., normal position, an upright position or orientation). The example aircraft 102 includes a fuselage 106, a left wing 108, a right wing 110 (FIG. 1B), a nose 112, a tail 114, an upper surface 116, and a lower surface 118. To facilitate discussion of this disclosure, examples disclosed herein are discussed in connection with a cartesian coordinate system 120. An X-axis (e.g., a first axis) of the cartesian coordinate system 120 is parallel to the fuselage 106 of the aircraft 102 and extends between the nose 112 and the tail 114, a Y-axis (e.g., a second axis) is perpendicular to the X-axis and extends laterally across the wings 108, 110 (e.g., into the page and out of the page in the orientation of FIG. 1A) of the aircraft 102, and a Z-axis (e.g., a third axis) is perpendicular to both the X-axis and the Y-axis and extends vertically in the orientation of FIG. 1A between the upper surface 116 and the lower surface 118. As shown in FIG. 1A, when the example aircraft 102 is in the normal attitude 100, the example passive system 104 is also in the normal attitude 100 as illustrated by an upward arrow 122. In the orientation of FIG. 1A, when the aircraft 102 is in the normal attitude 100, the upper surface 116 of the aircraft 102 (e.g., a cockpit) is oriented upwards in the Z-axis direction, and the lower surface 118 (e.g., a landing gear) is oriented downwards in the Z-axis direction.

Figure 1B:
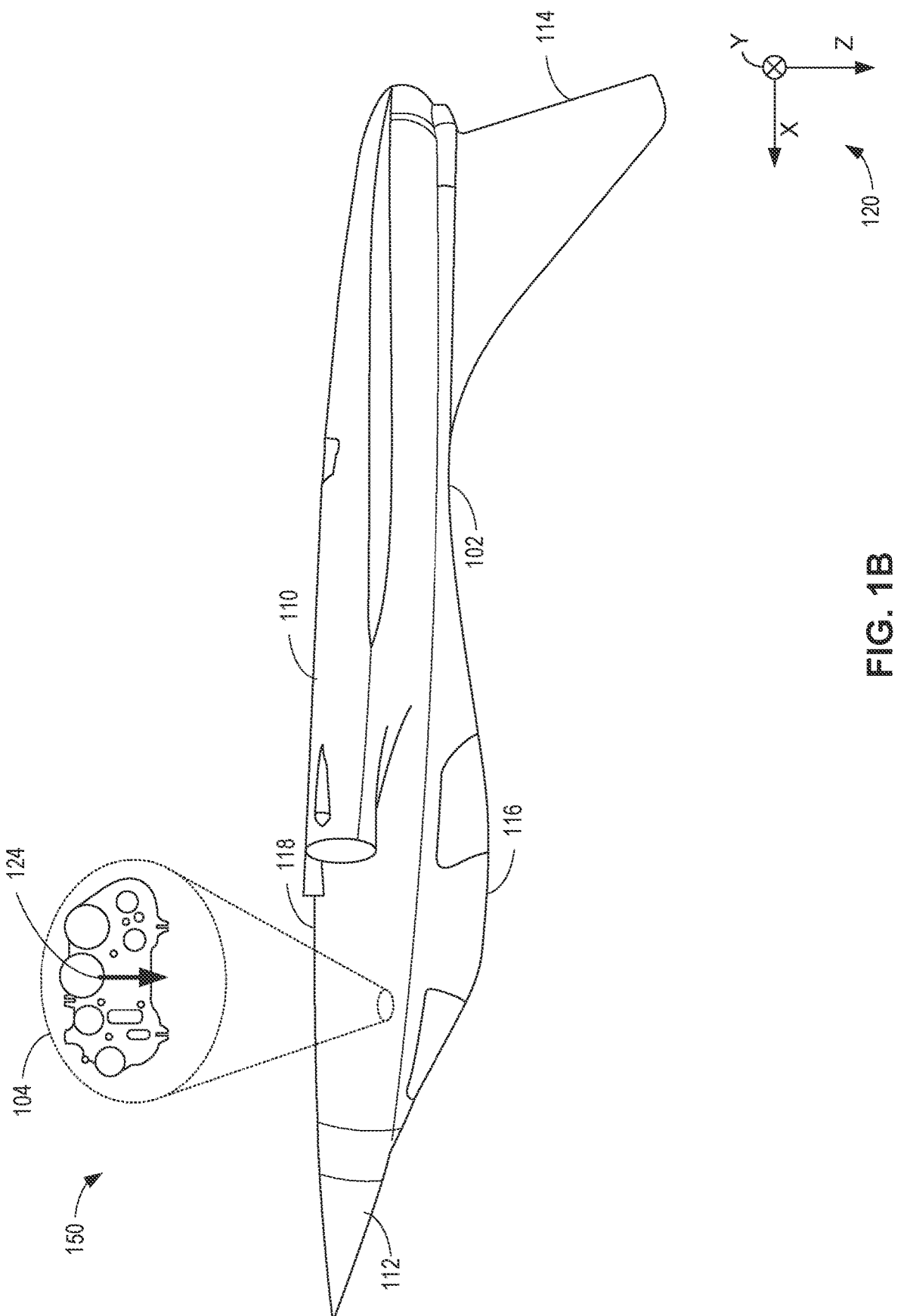
FIG. 1B illustrates the example aircraft of FIG. 1A in an example inverted attitude.

FIG. 1B illustrates an example aircraft 102 of FIG. 1A in an inverted attitude 150 (e.g., inverted position). As shown in FIG. 1B, when the example aircraft 102 is in the inverted attitude 150, the example passive system 104 is also in the inverted attitude 150 as illustrated by a downwards arrow 124. In the orientation of FIG. 1B, when the aircraft 102 is in the inverted attitude 150, the upper surface 116 is oriented downwards in the Z-axis direction, and the lower surface 118 is oriented upwards in the Z-axis direction. The aircraft 102 is movable between the normal attitude 100 and the inverted attitude 150.

Figure 2:
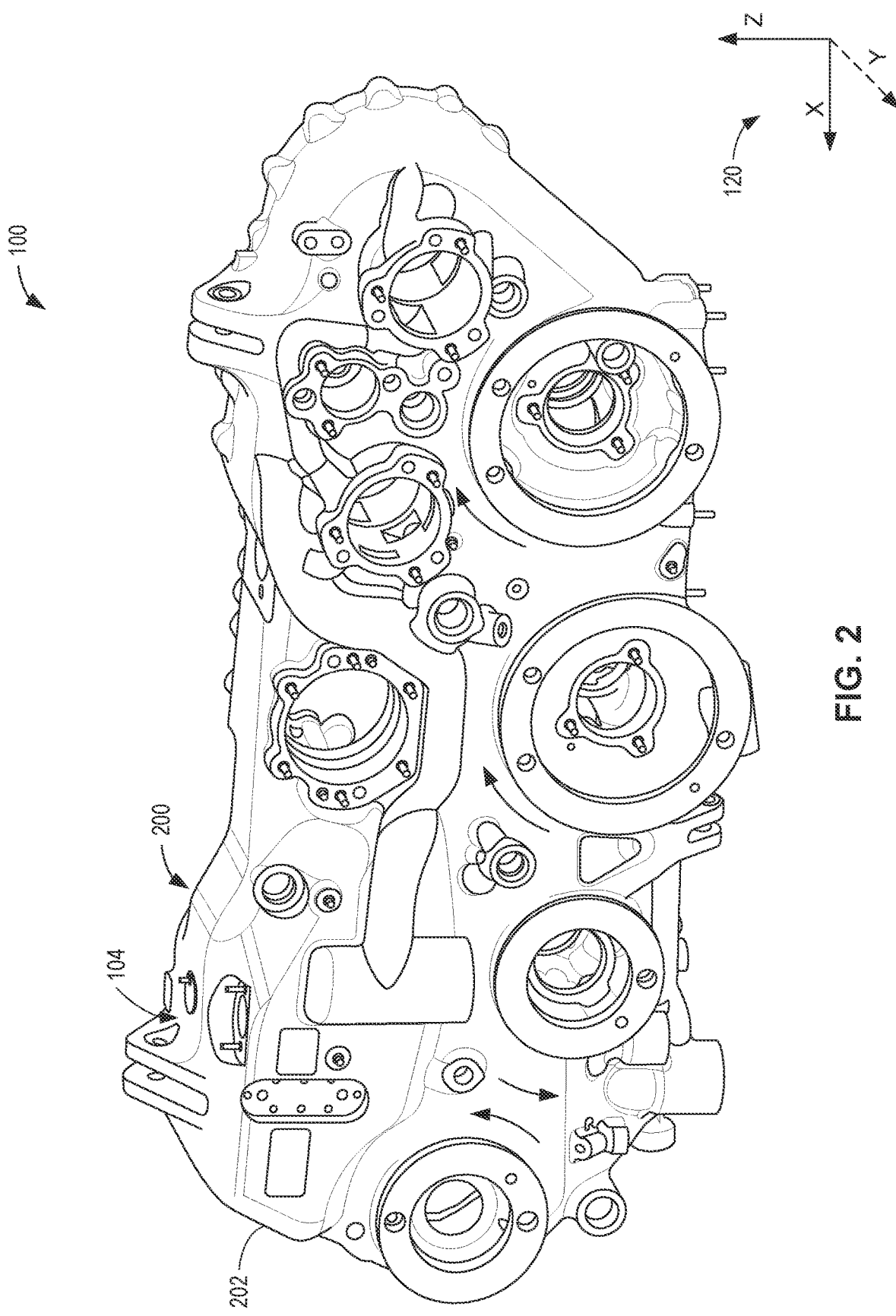
FIG. 2 is a perspective view of the example passive system of FIGS. 1A and 1B.

FIG. 2 is a perspective view of an example transmission 200 of the aircraft 102 of FIGS. 1A and 1B including the example passive system 104 of FIGS. 1A and 1B. The example transmission 200 is depicted in the normal attitude 100 (e.g., normal orientation). The example transmission 200 of the illustrated example includes a casing 202. In some examples, the transmission 200 and/or the casing 202 is a gearbox, a transmission system, a gear transmission system, etc. The transmission 200 of the illustrated example provides auxiliary power to portions of the aircraft 102 (FIGS. 1A-1B). The example casing 202 houses a plurality of gears and includes a plurality of pressurized fluid reservoirs. In some examples, the casing 202 (e.g., an external surface of the casing 202) is manufactured from aluminum, alloys, steel, a combination thereof, and/or any other suitable material(s).

Figure 3:
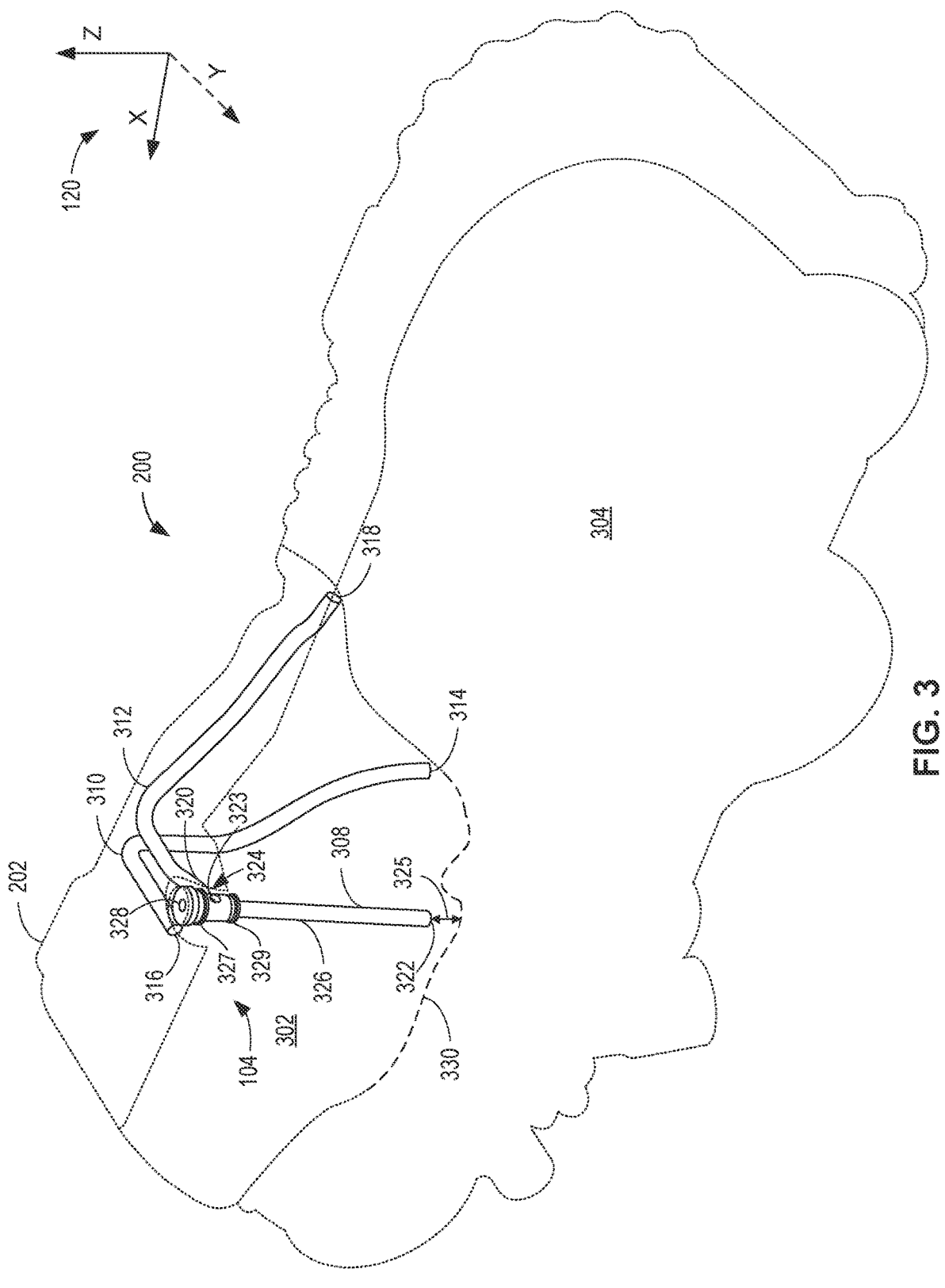
FIG. 3 is a schematic view of the example passive system of FIG. 2.

FIG. 3 is a schematic view of the passive system 104 and/or the transmission 200 of FIG. 2. Internal components (e.g., gears, passageways, etc.) of the casing 202 are removed for clarity. The passive system 104 of the illustrated example includes an example first reservoir 302 (e.g., an oil chamber, a first pressurized fluid reservoir, an isolated reservoir, small cavity, an inversion chamber, etc.) and an example second reservoir 304 (e.g., a main cavity or gear chamber, a second pressurized fluid reservoir, reservoir tank, gearbox reservoir, large cavity, main chamber, etc.) defined by the casing 202. The first reservoir 302 has a first volume and the second reservoir 304 has a second volume different (e.g., greater) than the first volume. In some examples, the first reservoir 302 has a first volume of around eight hundred and fifty cubic inches (e.g., 850 cubic inches ±100 cubic inches) or approximately three gallons (e.g., 3 gallons ±1 gallon). In some examples, the second reservoir 304 has a second volume of around two thousand cubic inches (e.g., 2,000 cubic inches ±100 cubic inches) or approximately eight gallons (e.g., 8 gallons ±1 gallon). The first reservoir 302 and the second reservoir 304 are filled with a combination of a first fluid (e.g., air) and a second fluid (e.g., oil) as described in connection with FIGS. 7A and 7B.

The example passive system 104 of the illustrated example further includes an example breather tube 308, an example first passageway 310, and an example second passageway 312. The first passageway 310, the second passageway 312 and the breather tube 308 fluidly couple the first reservoir 302 and the second reservoir 304. For example, the first passageway 310 and the second passageway 312 enable air to transport between the first reservoir 302 and the second reservoir 304 depending on an attitude (e.g., the normal attitude 100 or the inverted attitude 150) of the aircraft 102.

The first passageway 310 (e.g., a first fluid flow pathway) of the illustrated example includes an example first port 314 at a first end of the first passageway 310 and an example second port 316 at a second end of the first passageway 310 opposite the first port 314. Likewise, the second passageway 312 includes an example third port 318 at a first end of the second passageway 312 and an example fourth port 320 at a second end of the second passageway 312 opposite the third port 318. The example breather tube 308 includes an example fifth port 322 at a first end of the breather tube 308 and an example sixth port 323 at the second end of the breather tube 308 that is opposite the first end of the breather tube 308. The breather tube 308 of the illustrated example fluidly couples to the second passageway 312.

The breather tube 308 of the illustrated example includes a tube 326 and a coupling 328. The coupling 328 enables the breather tube 308 to couple to the casing 202. For example, the coupling 328 couples to the casing 202 via a fastener (e.g., a screw or a positive retention feature or device). In some examples, the coupling 328 can be press-fit within an opening formed in the casing 202. The example breather tube 308 is approximately eight and one half inches (e.g., 8.5 inches ±1 inch). The tube 326 extends or projects from the coupling 328 and is positioned in the first reservoir 302. For instance, the fifth port 322 of the breather tube 308 (e.g., a first end of the breather tube 308) is offset by a distance 325 from an interior wall 330 (e.g., contour, surface, bottom wall) of the first reservoir 302. In some examples, the distance 325 (e.g., a gap, a space, an offset, etc.) is approximately half of an inch (e.g., 0.5 inches ±0.25 inches or approximately between 0.25 inches and 0.75 inches). Therefore, a vertical distance of the first reservoir 302 is approximately nine inches (e.g., 9.0 inches ±1 inch) that includes the distance corresponding to the breather tube 308 and the distance 325 corresponding to the offset of the breather tube 308 from the interior wall 330.

The example sixth port 323 of the breather tube 308 and the example fourth port 320 of the second passageway 312 are fluidly coupled by an example interface 324. In particular, the interface 324 of the breather tube 308 couples to the fourth port 320 (e.g., the second end) of the second passageway 312. For example, the interface 324 can be a port to receive the fourth port 320 of the second passageway 312. The example interface 324 of the illustrated example includes a first seal 327 (e.g., a first O-ring) and a second seal 329 (e.g., a second O-ring) spaced from the first seal 327 provided around a portion of the breather tube 308 that is coupled to the casing 202. Specifically, the coupling 328 includes the first seal 327 adjacent a first end of the coupling 328 and the second seal 329 adjacent a second end of the coupling 328 opposite the first end to seal or fluidly opening of the casing 202 that receives the coupling 328. In other words, the first seal 327 and the second seal 329 enclose or seal the fourth port 320 and the sixth port 323 from the first reservoir 302 or an exterior of the casing 202 at the interface 324. In other words, the opening of the casing 202 that receives the coupling 328 is fluidly isolated from the first reservoir 302 (except through the second passageway 312 and/or the breather tube 308) and an exterior of the casing 202. In this manner, fluid flowing through the breather tube 308 is fluidly coupled to the fourth port 320 of the second passageway 312. The breather tube 308 is not fluidly coupled to the first passageway 310. The breather tube 308 is to fluidly couple the first reservoir 302 and the second reservoir 304 via the second passageway 312. In some examples, the fourth port 320 can overlap a portion of the breather tube 308 (e.g., a protruding member or port) at the interface 324 and a clamp or fastener can sealingly couple the fourth port 320 and the second passageway 312 and the breather tube 308. In some examples, the breather tube 308 is made from aerospace grade aluminum and/or any other suitable material(s).

Additionally, the breather tube 308 of the illustrated example is valveless. In other words, the passive system 104 disclosed herein does not employ a valve or a fluid control member to control fluid flow between the first reservoir 302 and the second reservoir 304 via the first passageway 310 and/or the second passageway 312. For example, when the passive system 104 and/or the casing 202 of the illustrated example are in the normal attitude 100, the first passageway 310 enables passive fluid flow between the first reservoir 302 and the second reservoir 304 (e.g., the fluid passively flows from the first reservoir 302 to the second reservoir 304). When the passive system 104 and/or the casing 202 are in the inverted attitude 150, the second passageway 312 and the breather tube 308 enables passive fluid flow between the first reservoir 302 and the second reservoir 304 (e.g., the fluid passively flows from the first reservoir 302 to the second reservoir 304). Additionally, depending on a pressure differential between the first reservoir 302 and the second reservoir 304, the first passageway 310 and the second passageway 312 of the illustrated example enable bi-directional flow between the first reservoir 302 and the second reservoir 304. For example, the first passageway 310 and the second passageway 312 of the illustrated example enable bi-directional fluid flow to equalize and/or stabilize pressure across the first reservoir 302 and the second reservoir 304 depending on the pressure differential between the first reservoir 302 and the second reservoir 304.

For instance, in the normal attitude 100, the second port 316 of the first passageway 310 provides an inlet and the first port 314 of the first passageway 310 provides an outlet to allow fluid (e.g., air) from the first reservoir 302 to flow to the second reservoir 304 (e.g., via the first passageway 310) when an example pressure differential is relatively high between the first reservoir 302 and second reservoir 304 (e.g., exceed 5 pounds/square inch (psi)). During operation or maneuvers involving high rates of descent (e.g., when in the normal attitude 100), the pressure differential between first reservoir 302 and second reservoir 304 reverses (e.g., does not exceed 5 pounds/square inch), causing flow to reverse. During such maneuvers involving high rates of descent, the outside air pressure increases rapidly, which increases the internal pressure of the second reservoir 304. In some such examples, the first port 314 of the first passageway 310 provides an inlet and the second port 316 of the first passageway 310 provides an outlet to allow fluid (e.g., air) to flow from the second reservoir 304 to the first reservoir 302 via the first passageway 310. Thus, in the normal attitude 100, the first passageway 310 provides fluid communication between the first reservoir 302 and the second reservoir 304.

Additionally, in the inverted attitude 150, the fifth port 322 of the breather tube 308 provides an inlet and the third port 318 of the second passageway 312 provides an outlet to allow fluid (e.g., air) from the first reservoir 302 to flow to the second reservoir 304 (e.g., via the second passageway 312) when the pressure differential is relatively high between the first reservoir 302 and second reservoir 304 (e.g., exceed 5 pounds/square inch (psi)). During operation or maneuvers involving high rates of descent or (e.g., in the inverted attitude 150), the pressure differential between first reservoir 302 and second reservoir 304 reverses (e.g., does not exceed 5 pounds/square inch), causing flow to reverse. In some such examples, the third port 318 of the second passageway 312 provides an inlet and the fifth port 322 of the breather tube 308 provides an outlet to allow fluid (e.g., air) to flow from the second reservoir 304 to the first reservoir 302 via the second passageway 312. Thus, in the inverted attitude 150, the second passageway 312 provides fluid communication between the first reservoir 302 and the second reservoir 304.

To enable fluid flow based on orientation of the aircraft 102, the second port 316 of the first passageway 310 is positioned at a different location or elevation relative to the fifth port 322 of the breather tube 308. For instance, the second port 316 of the first passageway 310 is spaced apart from the fifth port 322 of the breather tube 308 by a distance in the Z-axis direction that is substantially equal to a vertical height of the first reservoir 302. In the illustrated example, the second port 316 is spaced apart from the fifth port 322 by a distance of approximately eight and one half inches (e.g., 8.5 inches). For instance, the second port 316 is positioned adjacent an upper surface (e.g., a top surface) of the first reservoir 302, and the fifth port 322 is positioned adjacent a bottom surface of the first reservoir 302 (e.g., the interior wall 330). In this manner, in the normal attitude 100, the second port 316 is uncovered or in communication with a relatively lower density fluid (e.g., is not blocked by oil) and the fifth port 322 is covered by a relatively higher density fluid (e.g., covered by oil) to enable the lower density fluid (e.g., air) to flow through the first passageway 310 and restrict or prevent the higher density fluid (e.g., oil) from flowing through the second passageway 312. Likewise, in the inverted attitude 150, the second port 316 is covered by the higher density fluid (e.g., covered by oil) and the fifth port 322 is uncovered or in communication with the lower density fluid (e.g., is not blocked by oil) to enable fluid flow of the lower density fluid (e.g., air flow) through the second passageway 312 and restrict or prevent fluid flow of the higher density fluid (e.g., oil) through the first passageway 310.

Additionally, the third port 318 of the second passageway 312 is positioned at a different location or elevation relative to the first port 314 of the first passageway 310. For instance, the first port 314 of the first passageway 310 is spaced apart from the third port 318 of the second passageway 312 (e.g., by a distance in the Z-axis direction). In this manner, in the normal attitude 100, the third port 318 of the second passageway 312 is positioned at a higher location or elevation relative to the second reservoir 304 than the first port 314 of the first passageway 310. In other words, the third port 318, when the aircraft 102 is in the normal attitude 100, is above the first port 314. In contrast, when the aircraft 102 is in the inverted attitude 150, the third port 318 is at a lower location or elevation relative to the second reservoir 304 than the first port 314 of the first passageway 310. In other words, the third port 318, when the aircraft 102 is in the inverted attitude 150, is below the first port 314.

Figure 4A:
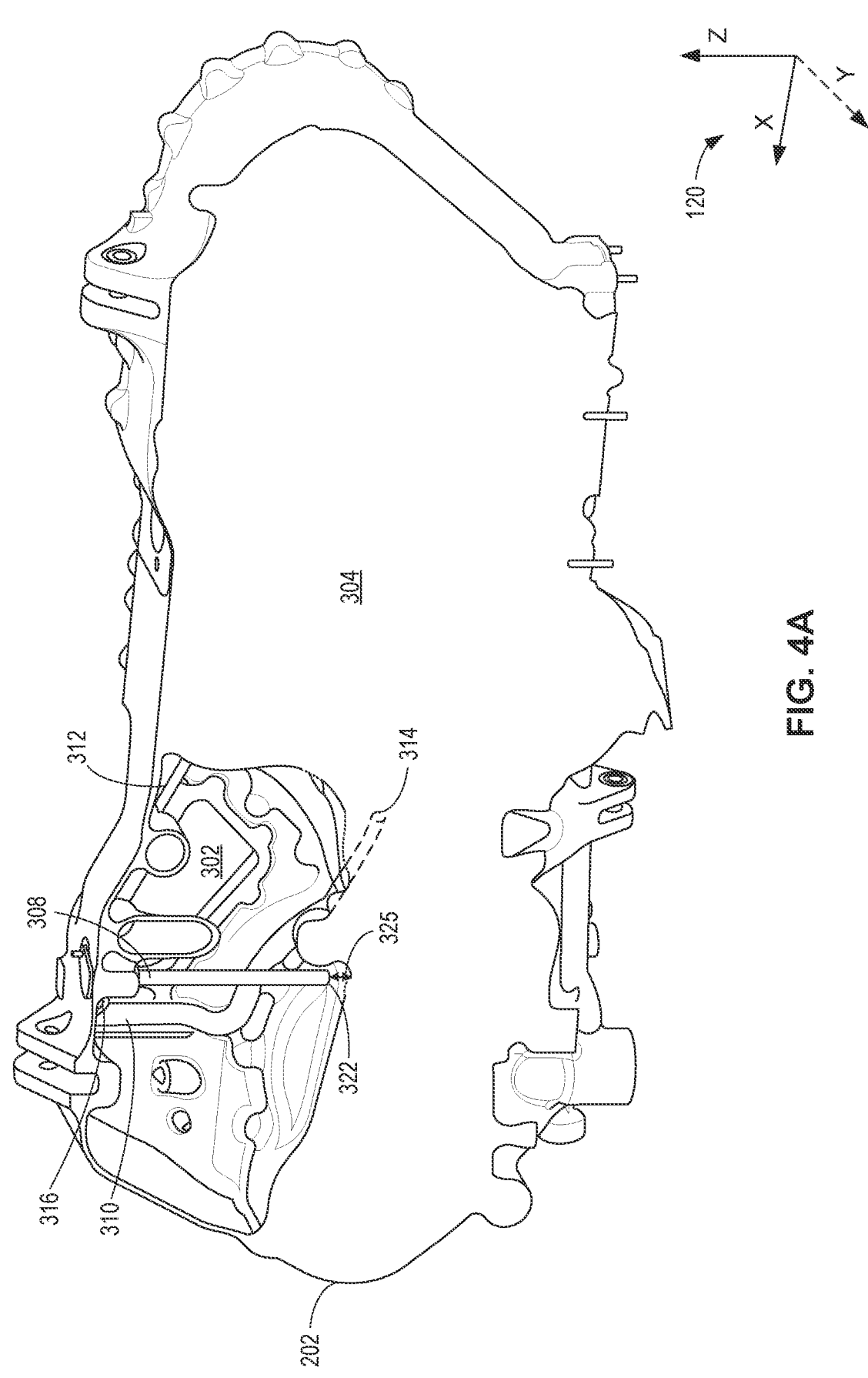
FIG. 4A is a partial cut-away view of the example passive system of FIG. 2.
Figure 4B:
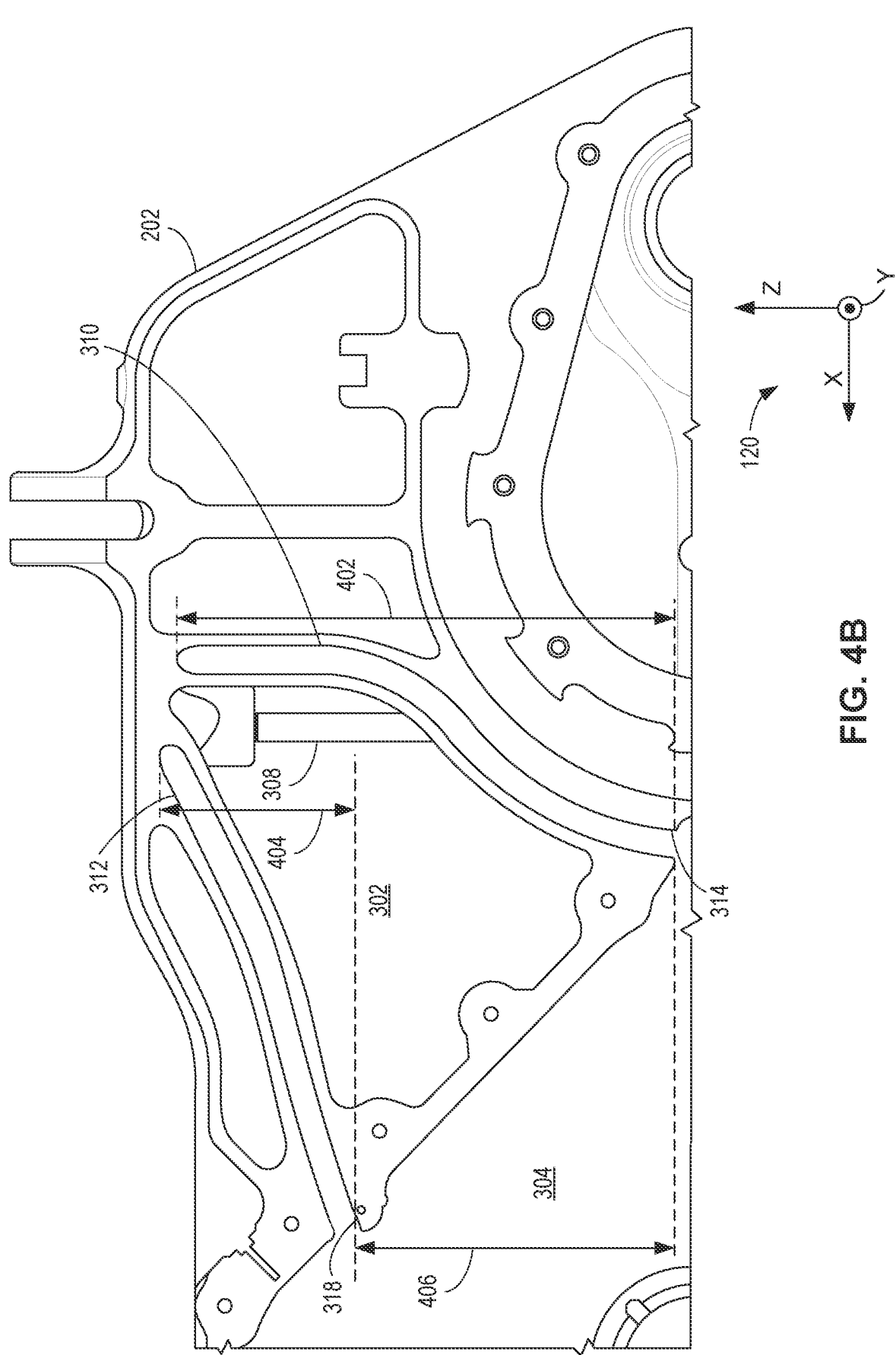
FIG. 4B is a partial cross-sectional view of an example first passageway, an example second passageway, and an example breather tube of an example casing of the example passive system of FIG. 3.
Figure 4C:
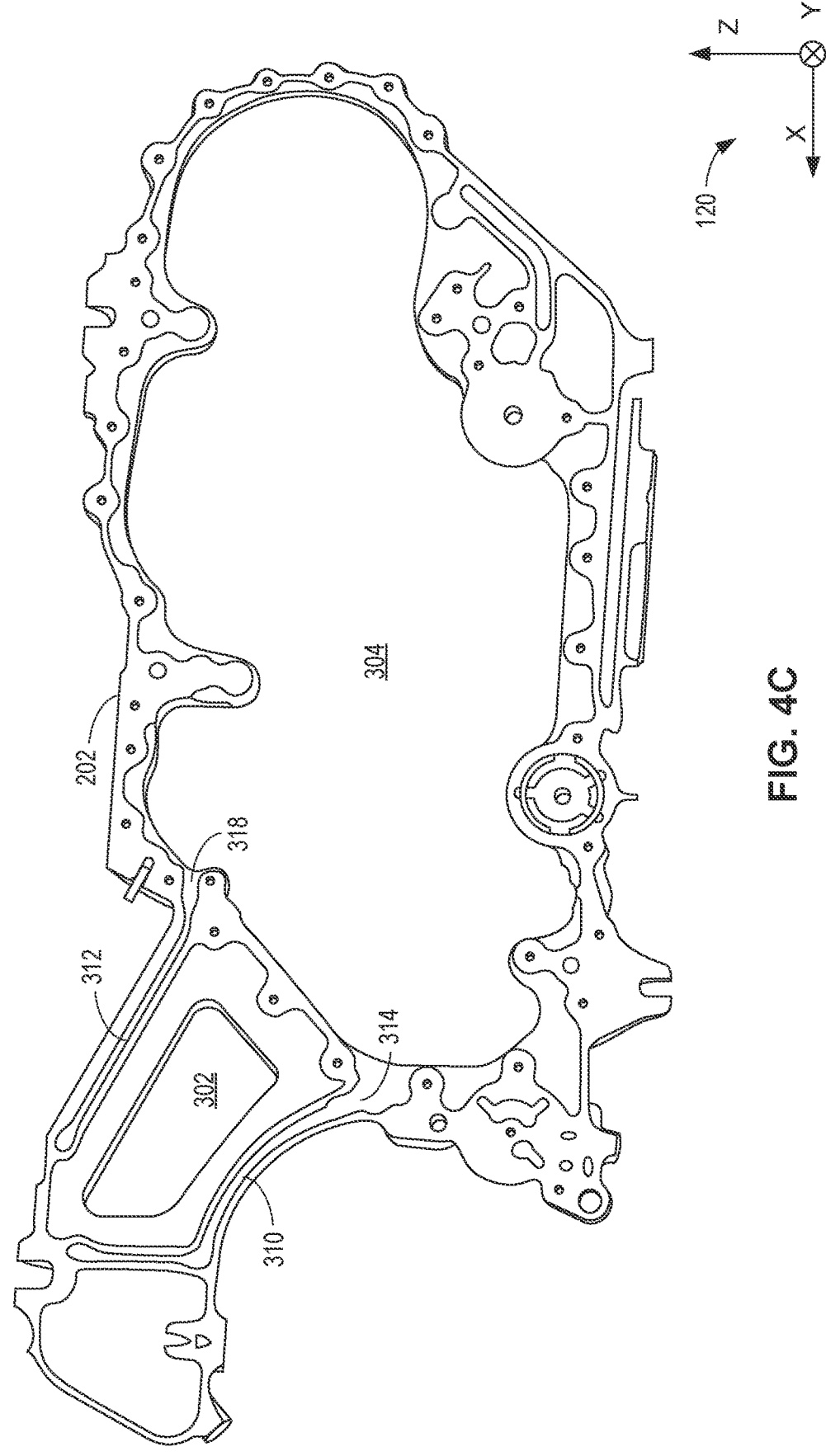
FIG. 4C is a cross-sectional view of the example casing of FIG. 4A.

FIG. 4A is a partial cut-away view of the example casing 202 of FIG. 2. FIG. 4B is a partial, cross-sectional view of the example casing 202 of FIG. 4A. FIG. 4C is a cross-sectional view of the example casing 202 of FIGS. 4A and 4B illustrating the first reservoir 302 (e.g., oil reservoir, isolated reservoir, small cavity, inversion chamber, etc.), the second reservoir 304 (e.g., the gearbox reservoir, the gearbox, large cavity, main chamber, etc.), the first passageway 310 and the second passageway 312.

A vertical height 402 between the first port 314 of the first passageway 310 and the second port 316 of the first passageway 310 is approximately eight- and three-quarter inches (e.g., 8.75 inches ±1 inch). A vertical height 404 between the third port 318 of the second passageway 312 and the fourth port 320 of the second passageway 312 is approximately three- and one-half inches (e.g., 3.5 inches ±1 inch). A distance 406 (e.g., a relative height difference) between the third port 318 and the first port 314 is approximately five- and one-quarter inches (e.g., 5.25 inches ±1 inch).

In the example of FIG. 4B, some internal components of the casing 202 are removed for clarity. In FIG. 4B, the cross-section is taken along portions of the first passageway 310 and the second passageway 312. The example breather tube 308 is shown in FIG. 4B. In the example of FIG. 4B, at least some portions of the first passageway 310 and the second passageway 312 are shown in the same lateral plane. However, in other examples, the first passageway 310 may be offset from the second passageway 312 relative to the Y-axis direction.

In FIG. 4C, the first passageway 310 and the second passageway 312 are shown integrally formed in the structure of the casing 202. The example breather tube 308 (FIG. 5A) is not shown in FIG. 4C. In the example of FIG. 4C, the first port 314 and the third port 318 are shown opening into the second reservoir 304. Thus, one or more walls of the casing 202 define the first passageway 310 and the second passageway 312, including the ports 316, 318, 320, 323.

Figure 5A:
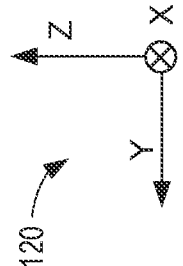
FIG. 5A is a front, cutaway view of the example casing illustrating an example first reservoir and the example first passageway of the example casing when the example passive system is in the example normal attitude.
Figure 5A:
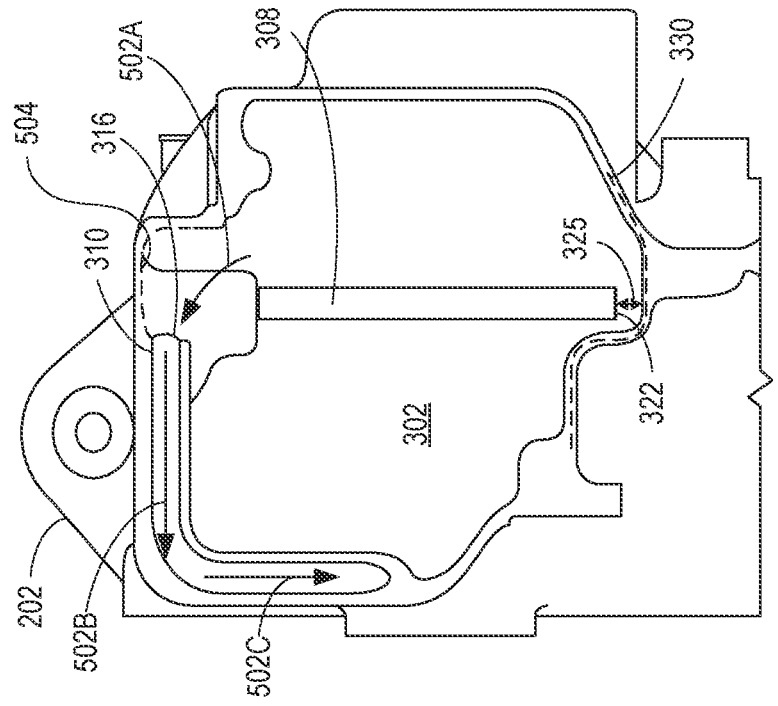

FIG. 5A is a front, cutaway view of the example casing 202 in the normal attitude 100 illustrating the example first reservoir 302 and the example first passageway 310 of the example casing 202. In the example of FIG. 5A, the second port 316 allows fluid (e.g., air) to flow from or adjacent an upper surface 504 (e.g., a top surface) of the first reservoir 302 to the second reservoir 304 via the first passageway 310. The fluid flow, when the casing 202 is in the normal attitude 100, follows example directional arrows 502. For example, the first fluid (e.g., air) flow starts in the first reservoir 302 as depicted by an example first directional arrow 502A. The fluid flow continues through the second port 316 as depicted by an example second directional arrow 502B. Then, the fluid flow continues downwards through the first passageway 310 and towards the second reservoir 304 via the first port 314 (FIG. 4C) as depicted by an example third directional arrow 502C. Additionally, although the fifth port 322 of the breather tube 308 is separated from the interior wall 330 by the distance 325, air flow through the breather tube 308 is restricted or prevented because the fifth port 322 of the breather tube 308 is submerged or covered in the second fluid (e.g., oil) contained in the first reservoir 302.

Figure 5B:
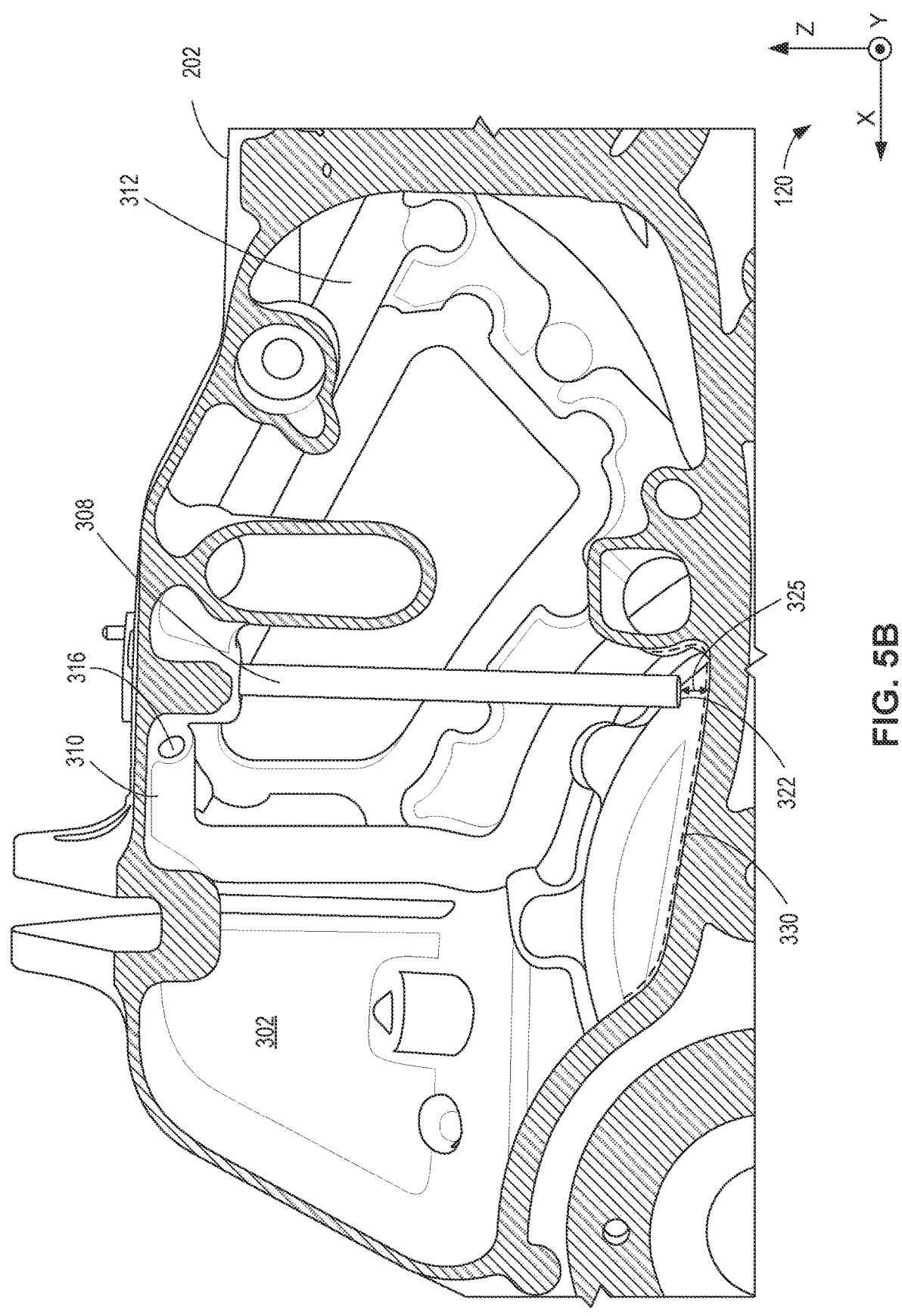
FIG. 5B is a side, cutaway view of the example casing in the example normal attitude and illustrating the example first passageway and the example breather tube of the example casing.

FIG. 5B is a side, cutaway view of the example casing 202 in the normal attitude 100. In the view of FIG. 5B, air within the first reservoir 302 passively flows to the second port 316 of the first passageway 310. In the view of FIG. 5B, the first passageway 310 is shown extending past the interior wall 330 of the casing 202 to connect (though not shown in FIG. 5B) with the example first port 314 (FIG. 4B) that is in communication with the second reservoir 304 (FIG. 4B). As noted above, in some instances, air flow is reversed through the first passageway 310 from the second reservoir 304 to the first reservoir 302 (e.g., depending on the pressure differential between the first reservoir 302 and the second reservoir 304).

Figure 6A:
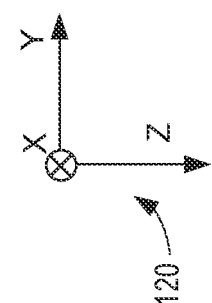
FIG. 6A is a front, cutaway view of the example casing in the example inverted attitude illustrating the example first fluid reservoir and the example second passageway.
Figure 6A:
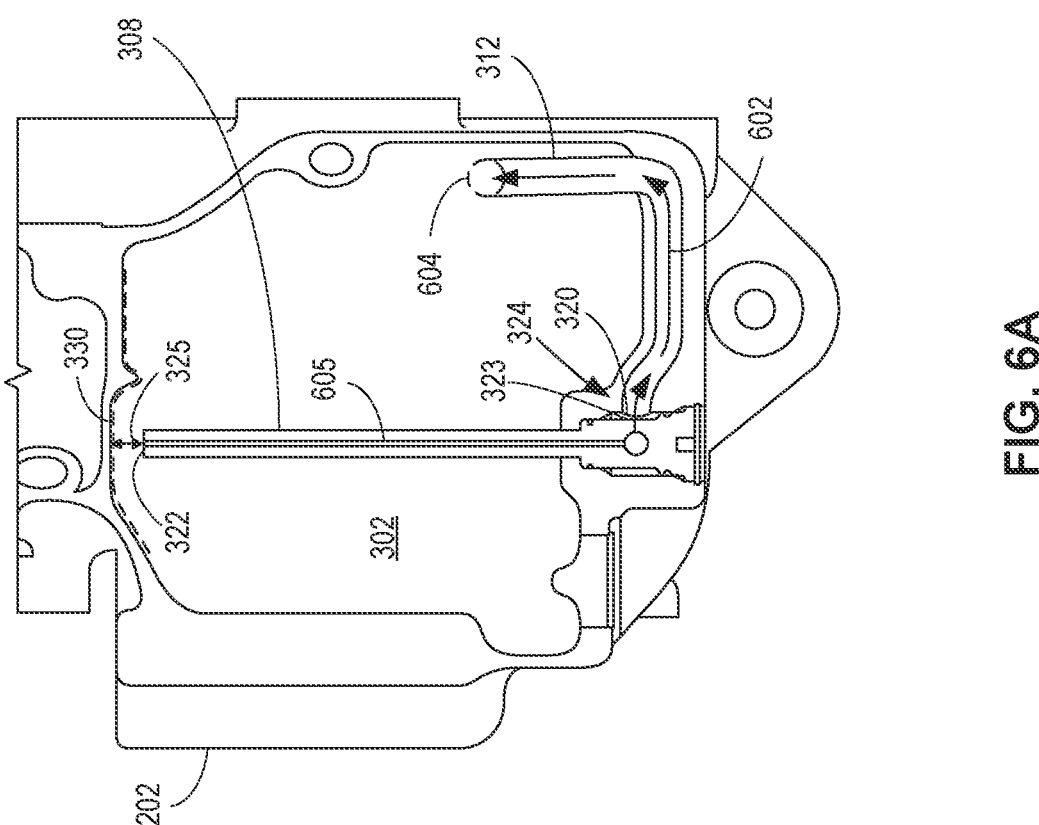
Figure 6B:
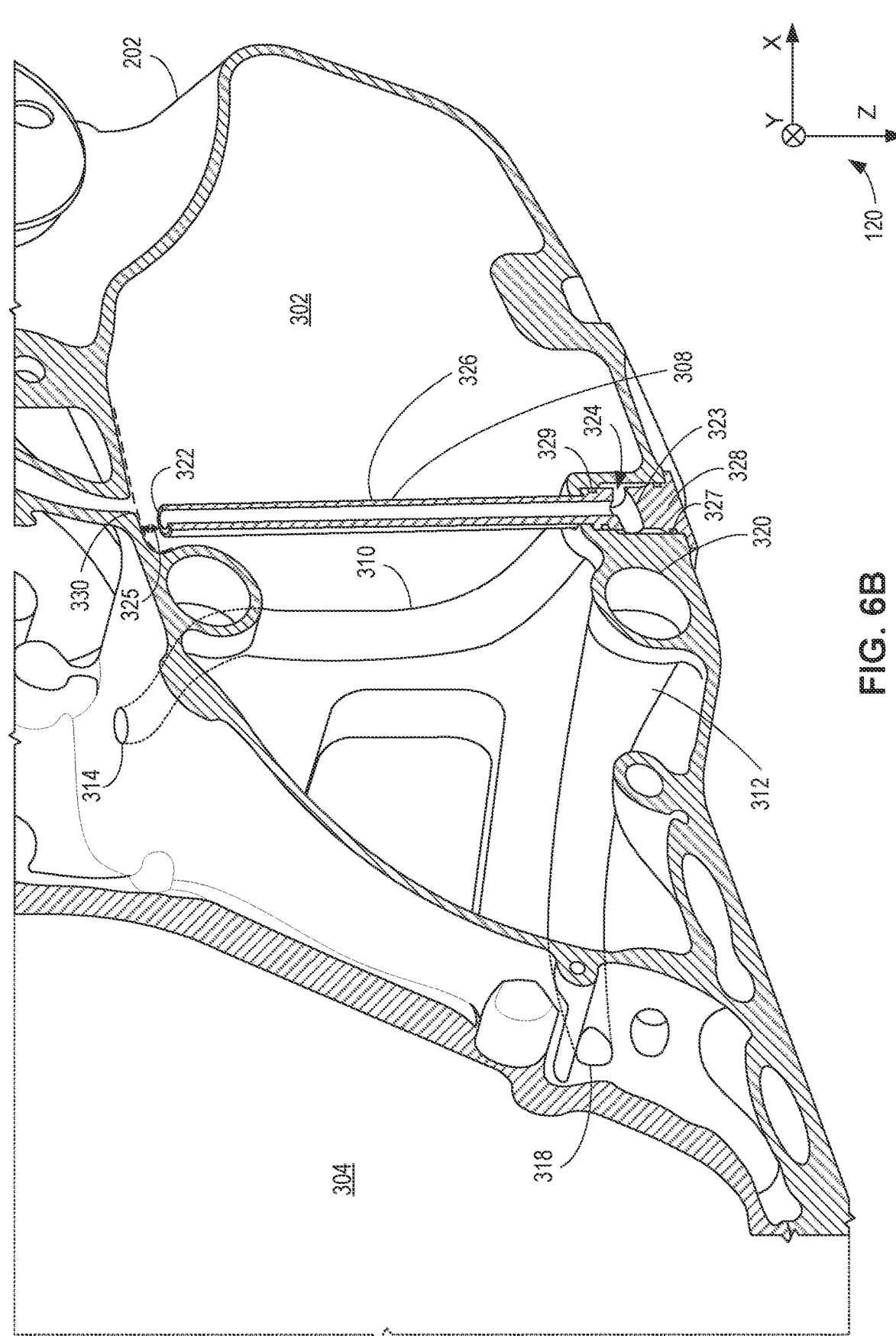
FIG. 6B is a partial, perspective view of the example casing of FIG. 6A illustrating the example first reservoir, an example second reservoir, the example passageways and the example breather tube.

FIG. 6A is a front, cutaway view of the example casing 202 in the inverted attitude 150 illustrating the first reservoir 302, the breather tube 308 and the second passageway 312. As shown in the example of FIG. 6A, the breather tube 308 is fluidly coupled (e.g., connected) at the example interface 324 to the second passageway 312. In the example of FIG. 6A, an example directional arrow 602 illustrates how fluid (e.g., air) flows through the fifth port 322 of the breather tube 308, where the fifth port 322 is shown offset by a distance 325 from the interior wall 330 (e.g., which is oriented as an upper wall in the inverted attitude 150). In the inverted orientation, the first fluid (e.g., air) is now positioned adjacent to the fifth port 322 and the second fluid (e.g., oil) covers the second port 316. The first fluid (e.g., air) flows through the breather tube 308, the example interface 324, and the second passageway 312, and flows to an example exit port 604. As shown in FIGS. 6A and 6B, the interface 324 (e.g., the first seal 327 and the second seal 329) seals the coupling 328 and the casing 202, thereby allowing the first fluid to pass through the coupling to the second passageway 312. In some examples, the exit port 604 is the third port 318 (FIG. 4B), and the exit port 604 directly opens up to the second reservoir 304. In some examples, the exit port 604 leads to further portions of the second passageway 312, before eventually leading to the third port 318 (FIG. 4B), which opens up to the second reservoir 304.

FIG. 6B is a partial, perspective view of the example casing 202 of FIG. 6A illustrating the first reservoir 302, the second reservoir 304, the passageways 310, 312 and the breather tube 308. The casing 202 is shown in the inverted attitude 150. In the inverted attitude 150, the first fluid (e.g., air) flows through the fifth port 322, through a passageway or opening 605 of the tube 326, through the sixth port 323 (e.g., an aperture of the coupling 328), and to the fourth port 320 of the second passageway 312 via the interface 324. In the example of FIG. 6B, the second passageway 312 includes the third port 318 that opens into the example second reservoir 304.

When the pressure differential between the first reservoir 302 and the second reservoir 304 is negative (e.g., maneuvers involving high rates of descent, etc.), the flow is reversed. In some such examples, the first fluid (air) flows through the third port 318 of the second passageway 312, through the fourth port 320, and to the sixth port 323 of the breather tube 308 via the interface 324. The fluid (air) flows through the passageway or opening 605 of the tube 326 before exiting at the fifth port 322 of the breather tube 308.

Figure 7A:
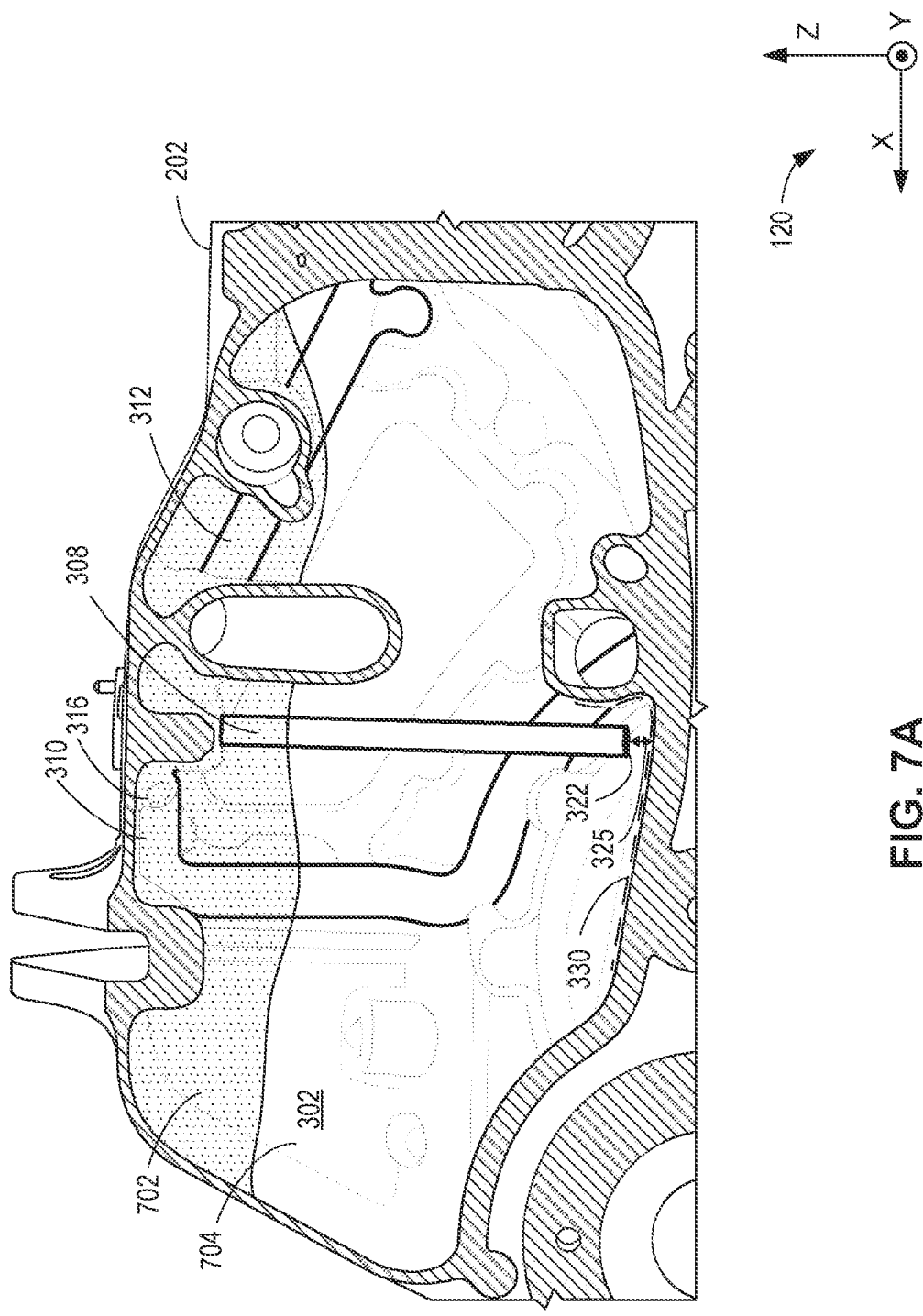
FIG. 7A is a view similar to FIG. 5B illustrating the example first reservoir filled with an example first fluid and an example second fluid.

FIG. 7A is a view similar to FIG. 5B illustrating the passive system 104 in the normal attitude 100. In the normal attitude 100, the first reservoir 302 is filled with the example first fluid 702 (e.g., air, lower density fluid) and the example second fluid 704 (e.g., oil, higher density fluid). In the example of FIG. 7A, the first fluid 702 has a density that is less than a density of the example second fluid 704. For example, the first fluid 702 is air and the second fluid 704 is oil. However, the first fluid 702 and the second fluid 704 can be other fluids. In some examples, the first fluid 702 is immiscible with respect to the second fluid 704.

As shown in FIG. 7A, the first fluid 702 (e.g., air, a lower density fluid) occupies a first volume (e.g., fills approximately twenty percent) of the example first reservoir 302 and the second fluid 704 (e.g., oil, a higher density fluid) occupies a second volume (e.g., fills approximately eighty percent) of the example first reservoir 302, where the second volume is different than the first volume of the example first reservoir 302. The first fluid 702 (e.g., air) and the second fluid 704 (e.g., oil) form a first layer of fluid and a second layer of fluid, where the first layer of fluid (e.g., an air layer) rests on top of the second layer of fluid (e.g., an oil layer). In the normal attitude 100 (as depicted in FIG. 7A), the second fluid 704 (e.g., oil) covers the fifth port 322 of the example breather tube 308 and the first fluid 702 (e.g., air) is in communication with the second port 316 of the first passageway 310.

In operation, a pressure differential between the first reservoir 302 and the second reservoir 304 causes the air in the first reservoir 302 to passively flow to the second reservoir 304. For example, the first passageway 310 passively allows (e.g., passively draws or transports) the air near the top of the first reservoir 302 in response to a change in pressure in the second reservoir 304. The first fluid 702 (e.g., air), after being passively transported by the first passageway 310, flows to the second reservoir 304 (FIG. 3) via the first port 314 (FIG. 3). In other words, the air flows forwards through the first passageway 310 to the second reservoir 304. Additionally, because the second fluid 704 (e.g., oil) covers the fifth port 322 of the tube 326 and/or the breather tube 308, the first fluid 702 (e.g., air) is not able to flow from the first reservoir 302 to the second reservoir 304 via the second passageway 312. In other words, the air is unable to flow backwards through the first passageway 310 to the first reservoir 302 from the second reservoir 304 (e.g., unless there is a sharp increase in ambient air pressure). In some examples, the second passageway 312 can provide fluid flow communication between the first reservoir 302 and the second reservoir 304. In some such examples, during operation of the aircraft 102 with high rates of descent, or with higher ambient air pressure, the first fluid 702 (e.g., air) flows from the second reservoir 304 to the example first reservoir 302.

In operation, the fluid flow is to equalize or stabilize (e.g., substantially maintain) the pressure between the first reservoir 302 and the second reservoir 304. In other words, the example breather tube 308, the example first passageway 310, and the example second passageway 312 enable fluid flow between the first reservoir 302 and the second reservoir 304 to maintain a substantially constant pressure between the first reservoir 302 and the second reservoir 304 regardless of the orientation (e.g., normal orientation, upright orientation, inverted orientation) of the casing 202. By maintaining a substantially constant pressure, the first passageway 310 and the second passageway 312 allow for pressure equalization between the first reservoir 302 (e.g., a main fluid reservoir) and the second reservoir 304 (e.g., a cavity of the gearbox).

As the example aircraft 102 performs the change in attitude (e.g., changes from the normal attitude 100 of FIG. 7A to the inverted attitude 150 of FIG. 7B by flipping over), a small portion of oil can temporarily enter the breather tube 308 and block airflow. This blockage of airflow causes a pressure differential to form between the first reservoir 302 and the second reservoir 304. In operation, the pressure of the first reservoir 302 is to be between three pounds per square inch (psi) (e.g., 3 psi) and ten psi (e.g., 10 psi), and the pressure of the second reservoir 304 is also to be between three PSI (e.g., 3 psi) and ten PSI (e.g., 10 psi). However, if there is a pressure differential of about one psi (e.g., 1.0 psi ±0.5 psi), the air in the first reservoir 302 may actively push the blocking oil out of the breather tube 308. This is referred to as "burping" where the air escapes. By burping, the air may move a small portion of the oil between the first reservoir 302 and the second reservoir 304 (e.g., from the first reservoir 302 to the second reservoir 304) as the air unblocks the breather tube 308 and the second passageway 312.

Figure 7B:
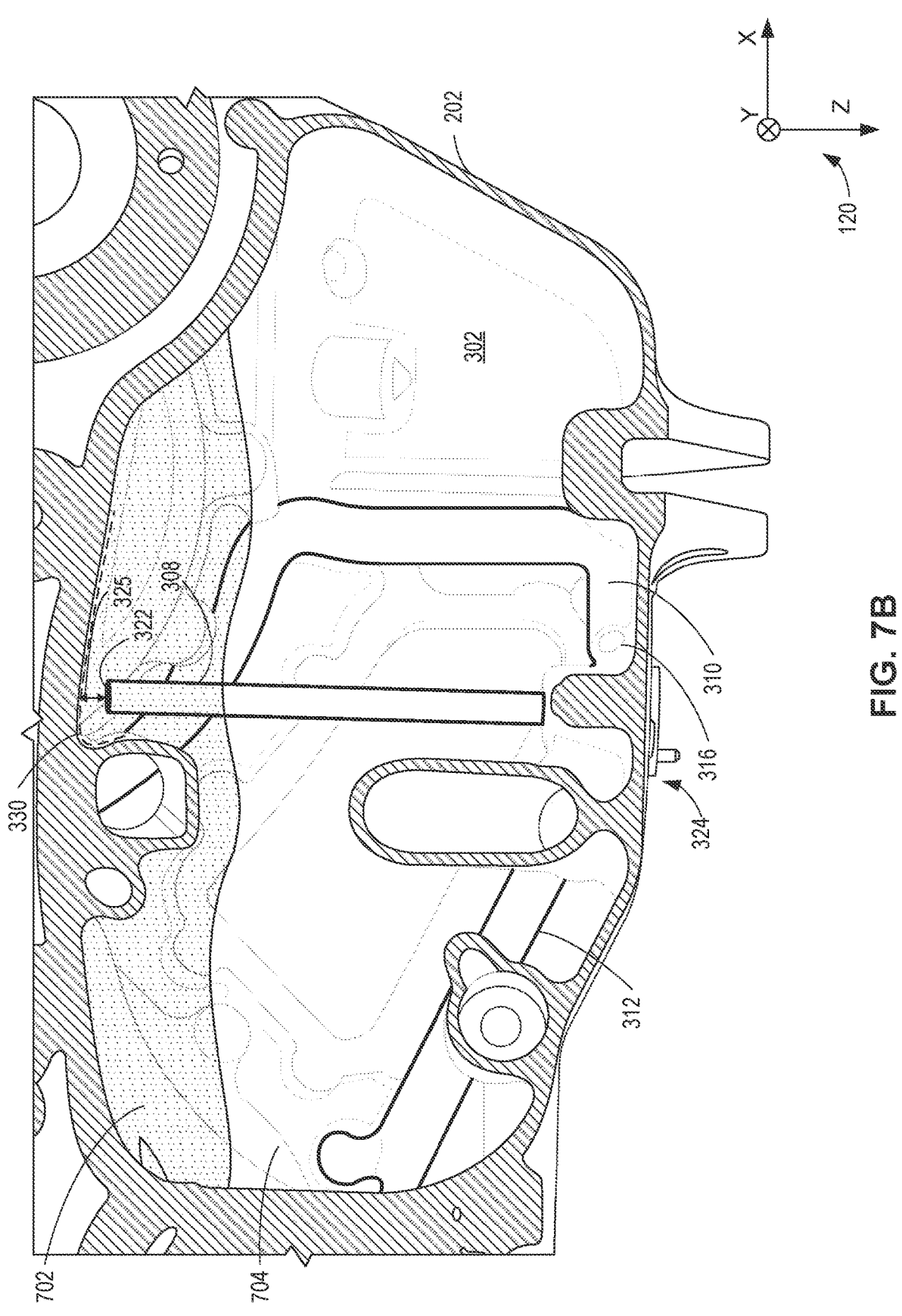
FIG. 7B is a view similar to FIG. 6B illustrating the example first reservoir filled with the example first fluid of FIG. 7A and the example second fluid of FIG. 7A.

FIG. 7B is a view similar to FIG. 6B illustrating the example first reservoir 302 filled with the example first fluid 702 (e.g., air) and the example second fluid 704 (e.g., oil). The example aircraft 102 is performing an inversion operation, and the example casing 202 is therefore in the inverted attitude 150. The second fluid 704 (e.g., oil) which has a density that is greater than a density of the example first fluid 702 (e.g., air) and based on the inverted attitude 150 of the casing 202, the second fluid 704 falls downwards and covers the second port 316 of the example first passageway 310. The first fluid 702, based on the lesser density, rises upwards to the top of the first reservoir 302 near the fifth port 322 of the breather tube 308.

In the inverted attitude 150, the example first fluid 702 (e.g., air) is pulled in through the fifth port 322 of the breather tube 308. After the first fluid 702 (e.g., air) is pulled in through the example distance 325 that defines the offset between the fifth port 322 and the interior wall 330. The first fluid 702 then passively travels through the breather tube 308, the interface 324, the second passageway 312 and eventually, travels to the example second reservoir 304. However, in other examples, there may be additional (e.g., supplemental, extra, etc.) ducting (e.g., more amount of passageway) in-between the first reservoir 302 and the second reservoir 304. In some examples, there is an oil pump that can transfer oil between the first reservoir 302 and the second reservoir 304.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

From the foregoing, it will be appreciated that example systems, apparatus, articles of manufacture, and methods have been disclosed that equalize pressure in fluid reservoirs of aircraft capable of inverted operation. Disclosed systems, apparatus, articles of manufacture, and methods improve the efficiency of aircraft by using a passive system to equalize pressure which does not require energy to pump fluids as in an active system.

Although each pressurized fluid tank disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Example apparatus to equalize pressure in an invertible aircraft are disclosed herein. Further examples and combinations thereof include the following:

Example 1 includes an aircraft including a casing including a first reservoir and a second reservoir, a first passageway to fluidly couple the first reservoir and the second reservoir, a second passageway to fluidly couple the first reservoir and the second reservoir, the second passageway separate from the first passageway, and a breather tube at least partially positioned in the first reservoir, the breather tube to fluidly couple the first reservoir and the second reservoir via the second passageway.

Example 2 includes the aircraft of example 1, wherein a first end of the breather tube is offset from an interior wall of the first reservoir and a second end of the breather tube is fluidly coupled to the second passageway.

Example 3 includes the aircraft of example 2, wherein the offset is a distance in a range of approximately example 0 includes 25 inches and approximately 2 inches.

Example 4 includes the aircraft of example 2, wherein the first reservoir and the second reservoir are to receive a first fluid and a second fluid different than the first fluid, the first fluid having a density that is less than a density of the second fluid.

Example 5 includes the aircraft of example 4, wherein the offset between the first end of the breather tube and the interior wall of the first reservoir is to be covered by the second fluid when the casing is in an upright orientation.

Example 6 includes the aircraft of example 4, wherein the offset between the first end of the breather tube and the interior wall of the first reservoir is to be in fluid communication with the first fluid when the casing is in an inverted orientation.

Example 7 includes the aircraft of example 1, wherein the first passageway is to provide a first fluid flow pathway between the first reservoir and the second reservoir when the aircraft is in a first attitude.

Example 8 includes the aircraft of example 7, wherein the second passageway and the breather tube enable fluid flow between the first reservoir and the second reservoir to allow a first pressure of the first reservoir to substantially equalize with a second pressure of the second reservoir when the casing is in a second attitude different than the first attitude.

Example 9 includes the aircraft of example 8, wherein the first passageway defines a first port in communication with the second reservoir, and the second passageway defines a second port in communication with the second reservoir, the first port positioned at a first elevation and the second port positioned at a second elevation different than the first elevation.

Example 10 includes the aircraft of example 9, wherein when the aircraft is in the first attitude the second port is positioned above the first port and a position of the second port restricts the second fluid in the second reservoir from flowing from the second port, through the second passageway, and to the breather tube to the first reservoir, and the first port is at a location that is lower than the second port, the first port to allow the second fluid to flow from the first reservoir, through the first passageway, and to the second reservoir.

Example 11 includes the aircraft of example 9, wherein when the aircraft is in the second attitude the first port is positioned above the second port, and a location of the first port restricts a second fluid in the second reservoir from flowing from the first port, through the first passageway, from the second reservoir to the first reservoir, and the second port is at a location that is lower than the first port, the location of the second port allowing the second fluid to flow forwards through the second passageway and the breather tube from the first reservoir to the second reservoir.

Example 12 includes the aircraft of example 1, wherein the breather tube is valveless.

Example 13 includes a transmission system including a casing providing a chamber including a first fluid having a first density and a second fluid having a second density more than the first density, the chamber to provide the second fluid to gears of the transmission system, a reservoir tank fluidly coupled to the chamber by a first passageway and a second passageway, the reservoir tank including the first fluid and the second fluid, and a breather tube coupled to the casing, the breather tube to extend within the reservoir tank to fluidly couple the second passageway between the reservoir tank and the chamber.

Example 14 includes the transmission system of example 13, wherein the casing includes an upper surface and a lower surface, the upper surface being above the lower surface when the transmission system is in a normal orientation, and lower surface being above the upper surface when the transmission system is in an inverted orientation.

Example 15 includes the transmission system of example 14, wherein an opening of the breather tube is covered by the second fluid when the casing is in the normal orientation.

Example 16 includes the transmission system of example 14, wherein an opening of the breather tube is not covered by the second fluid when the transmission system is in the inverted orientation.

Example 17 includes an aircraft movable in an upright orientation and an inverted orientation, the aircraft including a passive system including a fluid reservoir to store oil and air, a gearbox to include a plurality of gears, the gearbox including a cavity to store the oil and the air, a first passageway integrally formed with a casing of the gearbox, the first passageway to fluidly couple the fluid reservoir and the cavity of the gearbox, a second passageway integrally formed with the casing of the gearbox, the second passageway to fluidly couple the fluid reservoir and the cavity of the gearbox, and a breather tube coupled to a casing of the fluid reservoir, the breather tube to fluidly couple the second passageway, the fluid reservoir and the cavity of the gearbox when the aircraft is in the inverted orientation, the first passageway to fluidly couple the fluid reservoir and the cavity of the gearbox when the aircraft is in the upright orientation.

Example 18 includes the aircraft of example 17, wherein the first passageway is to allow air flow between the fluid reservoir and the cavity when the aircraft is in the upright orientation.

Example 19 includes the aircraft of example 17, wherein the second passageway is to allow air flow between the fluid reservoir and the cavity when the aircraft is in the inverted orientation.

Example 20 includes the aircraft of example 17, wherein the first passageway is to allow pressure stabilization between the fluid reservoir and the cavity of the gearbox when the aircraft is in the upright orientation and the second passageway and the breather tube are to allow pressure stabilization between the fluid reservoir and the cavity of the gearbox when the aircraft is in the inverted orientation.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An aircraft comprising:
   a casing including a first reservoir and a second reservoir;
   a first passageway to fluidly couple the first reservoir and the second reservoir;
   a second passageway to fluidly couple the first reservoir and the second reservoir, the second passageway separate from the first passageway; and
   a breather tube at least partially positioned in the first reservoir, the breather tube to fluidly couple the first reservoir and the second reservoir via the second passageway.

2. The aircraft of claim 1, wherein a first end of the breather tube is offset from an interior wall of the first reservoir and a second end of the breather tube is fluidly coupled to the second passageway.

3. The aircraft of claim 2, wherein the offset is a distance in a range of approximately 0.25 inches and approximately 2 inches.

4. The aircraft of claim 2, wherein the first reservoir and the second reservoir are to receive a first fluid and a second fluid different than the first fluid, the first fluid having a density that is less than a density of the second fluid.

5. The aircraft of claim 4, wherein the offset between the first end of the breather tube and the interior wall of the first reservoir is to be covered by the second fluid when the casing is in an upright orientation.

6. The aircraft of claim 4, wherein the offset between the first end of the breather tube and the interior wall of the first reservoir is to be in fluid communication with the first fluid when the casing is in an inverted orientation.

7. The aircraft of claim 1, wherein the first passageway is to provide a first fluid flow pathway between the first reservoir and the second reservoir when the aircraft is in a first attitude.

8. The aircraft of claim 7, wherein the second passageway and the breather tube enable fluid flow between the first reservoir and the second reservoir to allow a first pressure of the first reservoir to substantially equalize with a second pressure of the second reservoir when the casing is in a second attitude different than the first attitude.

9. The aircraft of claim 8, wherein the first passageway defines a first port in communication with the second reservoir, and the second passageway defines a second port in communication with the second reservoir, the first port positioned at a first elevation and the second port positioned at a second elevation different than the first elevation.

10. The aircraft of claim 9, wherein when the aircraft is in the first attitude:

the second port is positioned above the first port and a position of the second port restricts the second fluid in the second reservoir from flowing from the second port, through the second passageway, and to the breather tube to the first reservoir; and the first port is at a location that is lower than the second port, the first port to allow the second fluid to flow from the first reservoir, through the first passageway, and to the second reservoir.

11. The aircraft of claim 9, wherein when the aircraft is in the second attitude:

the first port is positioned above the second port, and a location of the first port restricts a second fluid in the second reservoir from flowing from the first port, through the first passageway, from the second reservoir to the first reservoir; and the second port is at a location that is lower than the first port, the location of the second port allowing the second fluid to flow forwards through the second passageway and the breather tube from the first reservoir to the second reservoir.

12. The aircraft of claim 1, wherein the breather tube is valveless.

13. A transmission system comprising:

a casing providing a chamber including a first fluid having a first density and a second fluid having a second density more than the first density, the chamber to provide the second fluid to gears of the transmission system;

a reservoir tank fluidly coupled to the chamber by a first passageway and a second passageway, the reservoir tank including the first fluid and the second fluid; and a breather tube coupled to the casing, the breather tube to extend within the reservoir tank to fluidly couple the second passageway between the reservoir tank and the chamber.

14. The transmission system of claim 13, wherein the casing includes an upper surface and a lower surface, the upper surface being above the lower surface when the transmission system is in a normal orientation, and lower surface being above the upper surface when the transmission system is in an inverted orientation.

15. The transmission system of claim 14, wherein an opening of the breather tube is covered by the second fluid when the casing is in the normal orientation.

16. The transmission system of claim 14, wherein an opening of the breather tube is not covered by the second fluid when the transmission system is in the inverted orientation.

17. An aircraft movable in an upright orientation and an inverted orientation, the aircraft comprising:

a passive system including:

a fluid reservoir to store oil and air;

a gearbox to include a plurality of gears, the gearbox including a cavity to store the oil and the air;

a first passageway integrally formed with a casing of the gearbox, the first passageway to fluidly couple the fluid reservoir and the cavity of the gearbox;

a second passageway integrally formed with the casing of the gearbox, the second passageway to fluidly couple the fluid reservoir and the cavity of the gearbox; and a breather tube coupled to a casing of the fluid reservoir, the breather tube to fluidly couple the second passageway, the fluid reservoir and the cavity of the gearbox when the aircraft is in the inverted orientation, the first passageway to fluidly couple the fluid reservoir and the cavity of the gearbox when the aircraft is in the upright orientation.

18. The aircraft of claim 17, wherein the first passageway is to allow air flow between the fluid reservoir and the cavity when the aircraft is in the upright orientation.

19. The aircraft of claim 17, wherein the second passageway is to allow air flow between the fluid reservoir and the cavity when the aircraft is in the inverted orientation.

20. The aircraft of claim 17, wherein the first passageway is to allow pressure stabilization between the fluid reservoir and the cavity of the gearbox when the aircraft is in the upright orientation and the second passageway and the breather tube are to allow pressure stabilization between the fluid reservoir and the cavity of the gearbox when the aircraft is in the inverted orientation.

\* \* \* \* \*